(12) United States Patent
Adam et al.

(10) Patent No.: US 6,554,874 B1
(45) Date of Patent: Apr. 29, 2003

(54) METHOD OF DYEING OR PRINTING POLYAMIDE-CONTAINING MATERIALS

(75) Inventors: Jean-Marie Adam, Rosenau (FR); Jean-Pierre Bacher, Buschwiller (FR)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 266 days.

(21) Appl. No.: 09/645,090

(22) Filed: Aug. 24, 2000

(30) Foreign Application Priority Data

Aug. 30, 1999 (EP) .............................. 99810780

(51) Int. Cl.$^7$ .............................. D06P 1/30; D06P 1/39; D06P 3/04; D06P 3/06; D06P 3/16

(52) U.S. Cl. .................. 8/924; 8/924; 8/641; 8/643

(58) Field of Search .................. 8/924, 641, 643; 544/208

(56) References Cited

U.S. PATENT DOCUMENTS 5,928,386 A 7/1999 Hurter et al. .................. 8/549

FOREIGN PATENT DOCUMENTS

| EP | 0708151 | 4/1996 |
|---|---|---|
| EP | 0808940 | 11/1997 |
| FR | 1228528 | 8/1960 |

OTHER PUBLICATIONS

Kraska, Jan; Wonjitkiewicz, Wincenty "Synthesis and some properties of some 1,3,5–triazine dyes, derivatives of 1,4–di-aminoanthraquinone". Przem. Chem. (1972), 51(1), 35–9 Jouranl (The whole jouranl is not available).*

* cited by examiner

*Primary Examiner*—Necholus Ogden
*Assistant Examiner*—Eisa Elhilo
(74) *Attorney, Agent, or Firm*—Kevin T. Mansfield

(57) ABSTRACT

The present invention relates to a method for the trichromatic dyeing or printing of natural or synthetic polyamide fiber material, which method comprises using at least one blue-dyeing dye of formula

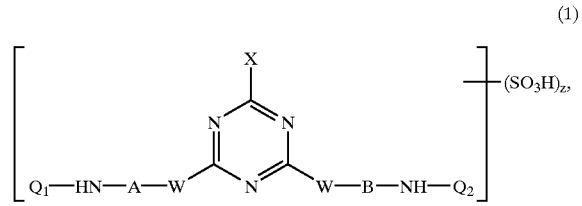
(1)

wherein X, W, A, B, $Q_1$, $Q_2$ and z are as defined in claim 1 for formula (1), together with at least one red-dyeing dye of formula

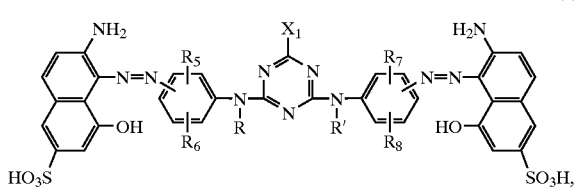
(2)

wherein R, R', $R_5$, $R_6$, $R_7$, $R_8$ and $X_1$ are as defined in claim 1 for formula (2), and together with at least one yellow- or orange-dyeing dye of formula

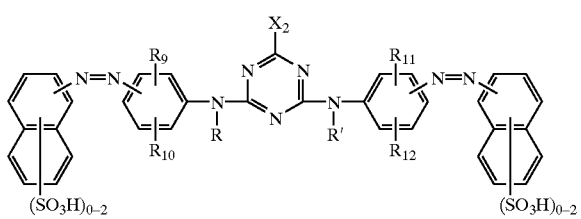
(3)

or of formula

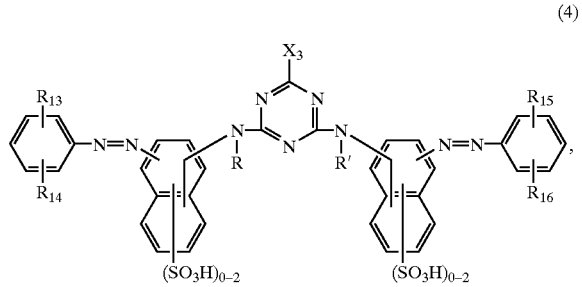
(4)

wherein R, R', $X_2$, $X_3$, $R_9$, $R_{10}$, $R_{11}$, $R_{12}$, $R_{13}$, $R_{14}$, $R_{15}$ and $R_{16}$ are as defined in claim 1 for formulae (3) and (4), and to new acid dyes.

6 Claims, No Drawings

METHOD OF DYEING OR PRINTING POLYAMIDE-CONTAINING MATERIALS

The present invention relates to a method for the trichromatic dyeing or printing of natural and synthetic polyamide fibre materials.

The problem underlying the present invention was to find a method of dyeing or printing natural and synthetic polyamide fibre materials using dyes suitable for combination according to the trichromatic principle.

The dyeing or printing of natural and synthetic polyamide fibre mat rials according to the trichromatic principle is known. It has, however, been found that the resulting dyeings do not always fully meet the highest demands, especially in respect of brilliance and fastness to wetting and light. There is therefore a need for new dyes that can bell used in a trichromatic dyeing technique and that yield dyeings or prints which exhibit very good fastness to wetting and/or light.

It has now been found that the problem can be solved according to he invention by the method described hereinbelow. The dyeings so obtained meet the Objectives set. In particular, the dyeings obtained are distinguished by uniform colour build-up and, at the same time, constancy of shade at different concentrations and by good combinability, as well as by good fastness to wetting properties and good fastness to light, The present invention relates to a method for the trichromatic dyeing or printing of natural or synthetic polyamide fibre material, which method comprises using at least one blue-dyeing dye of formula

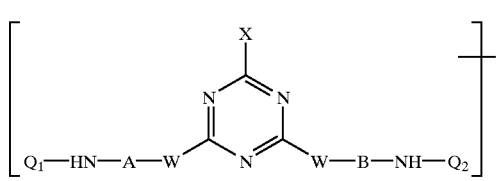

(1)

wherein

X is halogen, hydroxy, $C_1$–$C_4$alkoxy, S—$C_1$–$C_4$alkyl, —$NHR_1$, —$NHR_1R_2$, morpholino, piperidino or azepano, $R_1$ being unsubstituted or hydroxy- or carboxy-substituted $C_1$–$C_4$alkyl, and $R_2$ being unsubstituted or hydroxy-, sulfo-, carboxy- or phenyl-substituted $C_1$–$C_4$alkyl or phenyl, W is —$NR_3$— or —O—, $R_3$ being hydrogen or $C_1$–$C_4$alkyl, A and B are each independently of the other a cycloaliphatic or aromatic bridge member, $Q_1$ and $Q_2$ are each independently of the other an anthraquinone radical, and z is an integer 2, 3 or 4, together with at least one red-dyeing dye of formula (2)

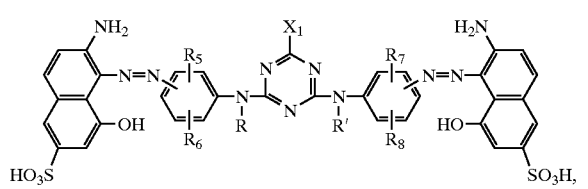

wherein

R and R' are each independently of the other hydrogen or unsubstituted or substituted $C_1$–$C_4$alkyl, $R_5$, $R_6$, $R_7$ and $R_8$ are each independently of the others hydrogen, $C_1$–$C_4$alkyl, $C_1$–$C_4$alkoxy, $C_2$–$C_4$alkanoylamino, ureido, halogen or sulfo, and $X_1$ is halogen, hydroxy, $C_1$–$C_4$alkoxy, S—$C_1$–$C_4$alkyl, —$NHR_1$, —$NR_1R_2$, morpholino, piperidino or azepano, $R_1$ being unsubstituted or hydroxy- or carboxy-substituted $C_1$–$C_4$alkyl, and $R_2$ being unsubstituted or hydroxy-, sulfo-, carboxy- or phenyl-substituted $C_1$–$C_4$ alkyl or phenyl, and together with at least one yellow- or orange-dyeing dye of formula (3)

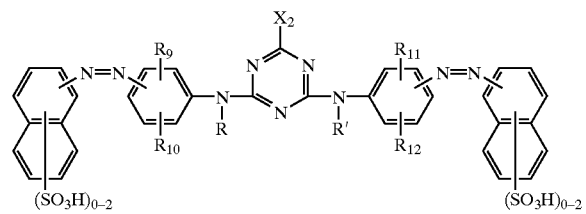

or of formula (4)

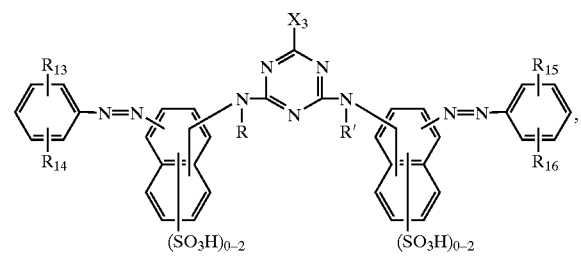

wherein

R and R' are each independently of the other hydrogen or unsubstituted or substituted $C_1$–$C_4$alkyl, $X_2$ and $X_3$ are each independently of the other halogen, hydroxy, $C_1$–$C_4$alkoxy, S—$C_1$–$C_4$alkyl, —$NHR_1$, —$NR_1R_2$, morpholino, piperidino or azepano, $R_1$ being unsubstituted or hydroxy- or carboxy-substituted $C_1$–$C_4$alkyl, and $R_2$ being unsubstituted or hydroxy-, sulfo-, carboxy- or phenyl-substituted $C_1$–$C_4$alkyl or phenyl, and $R_9$, $R_{10}$, $R_{11}$, $R_{12}$, $R_{13}$, $R_{14}$, $R_{15}$ and $R_{16}$ are each independently of the others hydrogen, $C_1$–$C_4$alkyl, $C_1$–$C_4$alkoxy, ureido, halogen, sulfo, or $C_2$–$C_4$alkanoylamino or $C_1$–$C_4$alkoxycarbonylamino each of which is unsubstituted or substituted in the alkyl moiety.

The trichromatic principle is understood to refer to the additive colour mixing of appropriately selected yellow- or orange-, red- and blue-dyeing dyes, by means of which it is possible to obtain any desired shade of the visible colour spectrum by suitably selecting the relative proportions of the dyes.

$C_1$–$C_4$Alkyl that comes into consideration for R, R', $R_1$, $R_2$, $R_3$, $R_5$, $R_6$, $R_7$, $R_8$, $R_9$, $R_{10}$, $R_{11}$, $R_{12}$, $R_{13}$, $R_{14}$, $R_{15}$ and $R_{16}$ is, for example, methyl, ethyl, propyl, isopropyl, butyl, isobutyl, sec-butyl or tert-butyl, with preference being given to methyl or ethyl, especially methyl. Radicals R and R' as $C_1$–$C_4$alkyl may be unsubstituted or substituted, for example by hydroxy, $C_1$–$C_4$—alkoxy, halogen or by sulfato, but are preferably unsubstituted.

$C_1$–$C_4$Alkoxy that comes into consideration for $R_5$, $R_6$, $R_7$, $R_8$, $R_9$, $R_{10}$, $R_{11}$, $R_{12}$, $R_{13}$, $R_{14}$, $R_{15}$, $R_{16}$ and X is, for example, methoxy, ethoxy, propoxy, isopropoxy, butoxy, sec-butoxy, isobutoxy or tert-butoxy, especially methoxy.

$C_2$–$C_4$Alkanoylamino that comes into consideration for $R_5$, $R_6$, $R_7$, $R_8$, $R_9$, $R_{10}$, $R_{11}$, $R_{12}$, $R_{13}$, $R_{14}$, $R_{15}$ and $R_{16}$ is, for example, propionylamino or, especially, acetylamino. Radicals $R_9$, $R_{10}$, $R_{11}$, $R_{12}$, $R_{13}$, $R_{14}$, $R_{15}$ and $R_{16}$ as $C_2$–$C_4$alkanoylamino may be unsubstituted or substituted, for example, in the alkyl moiety by $C_1$–$C_4$alkoxy or by hydroxy.

$C_1$–$C_4$Alkoxycarbonylamino that comes into consideration for $R_9$, $R_{10}$, $R_{11}$, $R_{12}$, $R_{13}$, $R_{14}$, $R_{15}$ and $R_{16}$ is especially methoxy- or ethoxy-carbonylamino. Radicals $R_9$, $R_{10}$, $R_{11}$, $R_{12}$, $R_{13}$, $R_{14}$, $R_{15}$ and $R_{16}$ as $C_1$–$C_4$alkoxycarbonylamino may be unsubstituted or substituted, for example, in the alkyl moiety by $C_1$–$C_4$alkoxy or by hydroxy.

S—$C_1$–$C_4$alkyl that comes into consideration for X, $X_1$, $X_2$ and $X_3$ is, for example, methylthio, ethylthio, propylthio or butylthio.

Halogen that comes into consideration for $R_5$, $R_6$, $R_7$, $R_8$, $R_9$, $R_{10}$, $R_{11}$, $R_{12}$, $R_{13}$, $R_{14}$, $R_{15}$, $R_{16}$, X, $X_1$, $X_2$ and $X_3$ is, for example, fluorine or bromine and, especially, chlorine.

A is preferably a cyclohexylene or phenylene radical.

B is preferably a cyclohexylene or phenylene radical.

W is preferably a radical of formula —$NR_3$—.

$X_1$, $X_2$ and $X_3$ are preferably fluorine or chlorine, especially chlorine.

R and R' are preferably, each independently of the other, hydrogen or $C_1$–$C_4$alkyl, especially hydrogen.

$R_3$ is preferably hydrogen.

$R_5$, $R_6$, $R_7$ and $R_8$ are preferably, each independently of the others, hydrogen, $C_1$–$C_4$alkyl, $C_1$–$C_4$alkoxy, $C_2$–$C_4$alkanoylamino, ureido or halogen, especially hydrogen.

$R_9$, $R_{10}$, $R_{11}$, $R_{12}$, $R_{13}$, $R_{14}$, $R_{15}$ and $R_{16}$ are preferably, each independently of the others, hydrogen, $C_1$–$C_4$alkyl, $C_1$–$C_4$alkoxy, ureido, halogen, or $C_2$–$C_4$alkanoylamino or $C_1$–$C_4$alkoxycarbonylamino each of which is unsubstituted or substituted in the alkyl moiety by $C_1$–$C_4$—alkoxy or by hydroxy.

As blue-dyeing dye there is preferably used at least one dye of formula

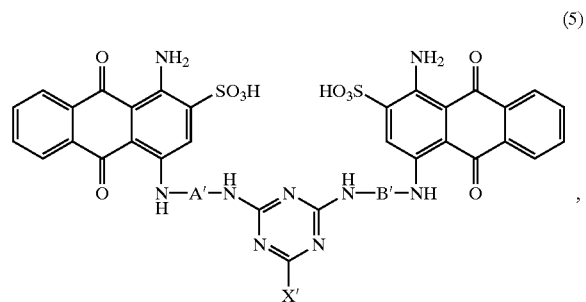

(5)

wherein
X' is —Cl, —OH, —N($CH_2CH_2OH$)$_2$, —N($CH_3$)($CH_2CH_2SO_3H$), —NH$CH_2$COOH, —N($CH_2CH_2CH_2CH_3$)$_2$,

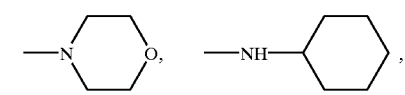

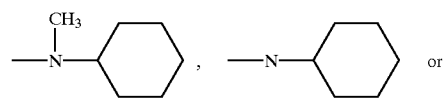

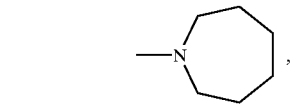

A' is a cyclohexylene or phenylene radical and
B' is a cyclohexylene or phenylene radical.

As blue-dyeing dye there is especially used the dye of formula

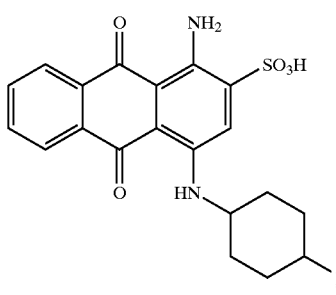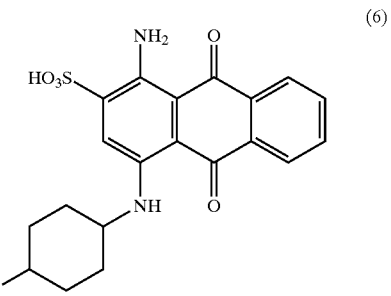

(6)

As blue-dyeing dye there is also especially used the dye of formula

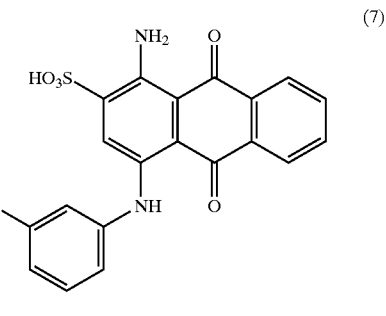

(7)

As red-dyeing dye there is preferably used at least one dye of formula

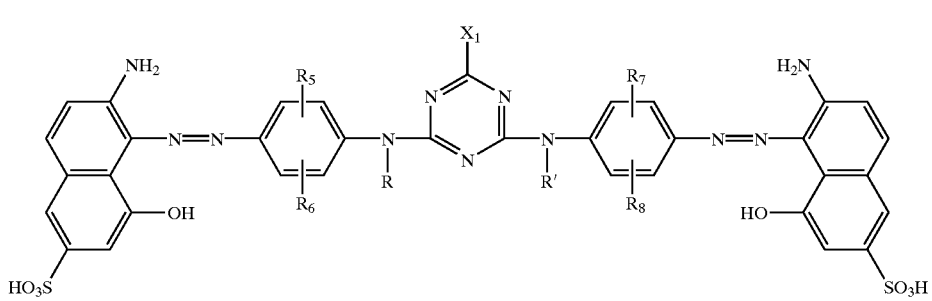

(8)

wherein R, R', $R_5$, $R_6$, $R_7$, $R_8$ and $X_1$ have the definitions and preferred meanings given above.

Especially preferred red-dyeing dyes are those of formula (2), more especially those of formula (8), wherein
- R and R' are each independently of the other hydrogen or $C_1$–$C_4$alkyl, especially hydrogen,
- $R_5$, $R_6$, $R_7$ and $R_8$ are each independently of the others hydrogen, $C_1$–$C_4$alkyl, $C_1$–$C_4$alkoxy, $C_2$–$C_4$alkanoylamino, ureido or halogen, especially hydrogen, and
- $X_1$ is fluorine or, especially, chlorine.

As red-dyeing dye there is more especially used a dye of formula

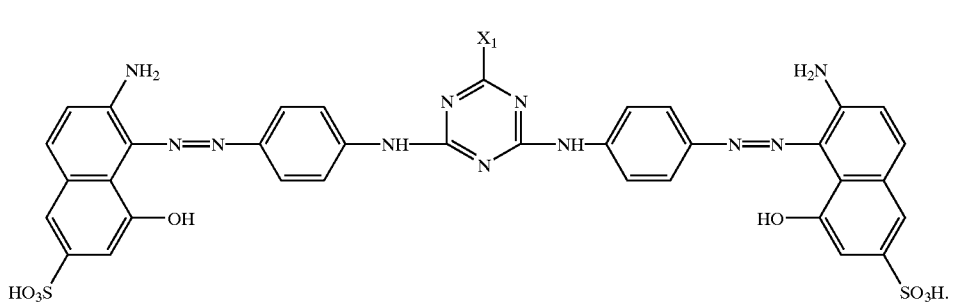

(9)

The yellow- or orange-dyeing dyes of formulae (3) and (4) preferably contain in the naphthalene rings, in each case, only one or two sulfo groups, and especially, in each case, only one sulfo group. The total number of sulfo groups of the dyes of formulae (3) and (4) is preferably in each case from two to four, especially two.

Preferred yellow- or orange-dyeing dyes of formula (3) are those of formula

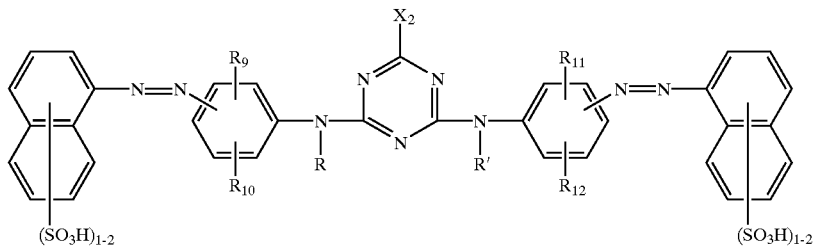

(10)

wherein R, R', $R_9$, $R_{10}$, $R_{11}$, $R_{12}$ and $X_2$ have the definitions and preferred meanings given above.

Especially preferred yellow- or orange-dyeing dyes of formula (3), more especially in the form of dyes of formula (10), are those wherein R and R' are each independently of the other hydrogen or $C_1$–$C_4$alkyl, especially hydrogen, $R_9$, $R_{10}$, $R_{11}$ and $R_{12}$ are each independently of the others hydrogen, $C_1$–$C_4$alkyl, $C_1$–$C_4$alkoxy, ureido, halogen, or $C_2$–$C_4$alkanoylamino or $C_1$–$C_4$alkoxycarbonylamino each which is unsubstituted or substituted in the alkyl moiety by $C_1$–$C_4$alkoxy or by hydroxy, $R_9$ and $R_{11}$ preferably being hydrogen, $X_2$ is fluorine or, especially, chlorine and the naphthalene rings of the dyes of formula (3) and of formula (10) contain, in each case, only one or two sulfo groups, and especially, in each case, only one sulfo group.

More especially preferred yellow- or orange-dyeing dyes of formula (3) are those of formula

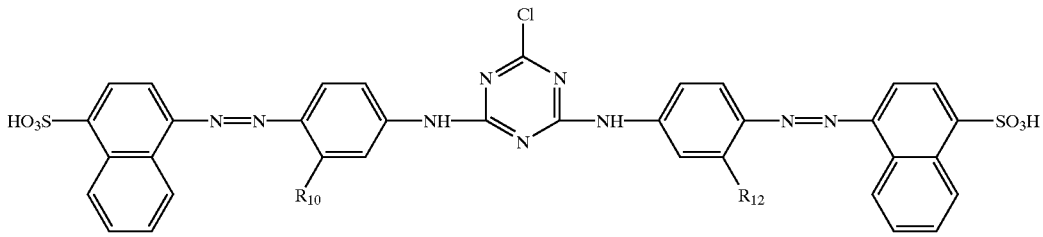

(11)

wherein $R_{10}$ and $R_{12}$ have the definitions and preferred meanings given above, $R_{10}$ and $R_{12}$ being preferably hydrogen, $C_1$–$C_4$alkyl, $C_1$–$C_4$alkoxy, ureido, halogen, or $C_2$–$C_4$alkanoylamino or $C_1$–$C_4$alkoxycarbonylamino each of which is unsubstituted or substituted in the alkyl moiety by $C_1$–$C_4$alkoxy or by hydroxy, especially $C_1$–$C_4$alkyl, $C_1$–$C_4$alkoxy, ureido, halogen, or $C_2$–$C_4$-alkanoylamino or $C_1$–$C_4$alkoxycarbonylamino each of which is unsubstituted or substituted in the alkyl moiety by $C_1$–$C_4$alkoxy or by hydroxy, and more especially ureido.

Preferred yellow- or orange-dyeing dyes of formula (4) are those of formula wherein R, R', $R_{13}$, $R_{14}$, $R_{15}$, $R_{16}$ and $X_3$ have the definitions and preferred meanings given above.

Especially preferred yellow- or orange-dyeing dyes of formula (4), more especially in the form of dyes of formula (12), are those wherein R and R' are each independently of the other hydrogen or $C_1$–$C_4$alkyl, especially hydrogen, $R_{13}$, $R_{14}$, $R_{15}$ and $R_{16}$ are each independently of the others hydrogen, $C_1$–$C_4$alkyl, $C_1$–$C_4$alkoxy, ureido, halogen, or $C_2$–$C_4$alkanoylamino or $C_1$–$C_4$alkoxycarbonylamino each of which is unsubstituted or substituted in the alkyl moiety by $C_1$–$C_4$alkoxy or by hydroxy, with $R_{13}$ and $R_{15}$ preferably being hydrogen, $X_3$ is fluorine or, especially, chlorine and the naphthalene rings of the dyes of formula (4) and of formula (12) contain, in each case, only one or two sulfo groups, and especially, in each case, only one sulfo group.

Of special interest as yellow- or orange-dyeing dyes are those of formula (3), especially those of formula (10) and more especially those of formula (11).

Of very special interest as yellow- or orange-dyeing dyes are those of formula (11) wherein $R_{10}$ and $R_{12}$ are ureido.

A preferred embodiment of the method according to the invention comprises using at least one red-dyeing dye of formula (8) together with at least one yellow- or orange-dyeing dye of formula (3), especially of formula (10) and more especially of formula (11); for the blue-dyeing dyes of formulae (1) and (2) the definitions and preferred meanings given above apply. As blue-dyeing dye(s) there is used especially at least one of the dyes of formulae (6) and (7).

(12)

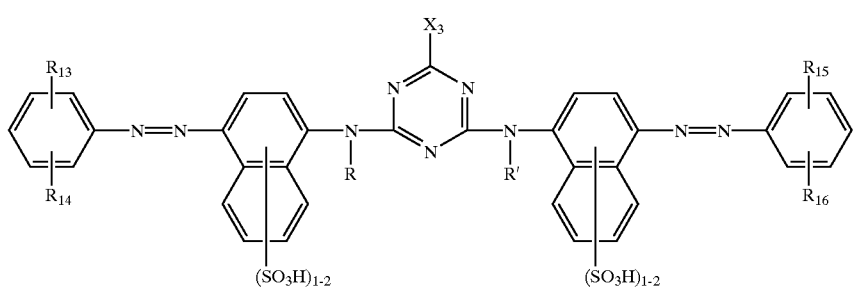

An especially preferred embodiment of the method according to the invention comprises using a red-dyeing dye of formula (9) together with at least one yellow- or orange-dyeing dye of formula (3), especially of formula (10) and more especially of formula (11); for the blue-dyeing dyes of formulae (1) and (2) the definitions and preferred meanings given above apply. As blue-dyeing dye(s) there is used especially at least one of the dyes of formulae (6) and (7).

A very especially preferred embodiment of the method according to the invention comprises using a red-dyeing dye of formula (9) together with a yellow- or orange-dyeing dye of formula (11) wherein $R_{10}$ and $R_{12}$ are ureido; for the blue-dyeing dyes of formulae (1) and (2) the definitions and preferred meanings given above apply. As blue-dyeing dye (s) there is preferably used at least one of the dyes of formulae (6) and (7).

The subject matter of the present invention also includes dye mixtures that comprise a mixture of at least one blue-dyeing dye of formula (1), together with at least one red-dyeing dye of formula (2) and together with at least one yellow- or orange-dyeing dye of formula (3) or (4), the definitions and preferred meanings given above applying to the dyes of formulae (1), (2), (3) and (4) and mixtures thereof.

The dyes of formula (1) are in some cases known or can be prepared in analogy to known dyes.

The dyes of formulae (6) and (7), which are covered by the generic formula (1), are new and the present invention relates also to those dyes.

The dye of formula (6) can be obtained, for example, by condensing cyanuric chloride with an amine of formula

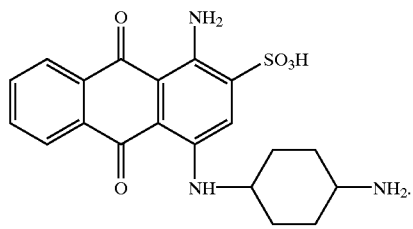

The dye of formula (7) can be obtained, for example, by condensing cyanuric chloride with an amine of formula

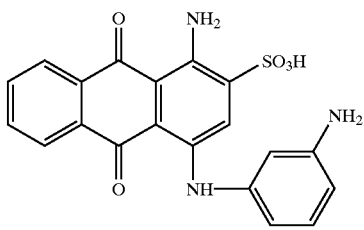

and hydrolysing the resulting product.

For preparation of the dyes of formulae (6) and (7), the cyanuric chloride is reacted with 2 equivalents of the relevant anthraquinone compound firstly at a temperature of from −5 to 20° C., which is increased in the course of the reaction to about from 30 to 50° C., the pH being kept neutral to slightly acid, preferably at a pH of from 5 to 7, by adding suitable bases, for example alkali metal bases such as lithium hydroxide or carbonate, sodium hydroxide or carbonate or potassium hydroxide or carbonate.

The dyes of formulae (2), (3) and (4) are known or can be prepared in analogy to known dyes.

Dyes of formula (2) can be obtained, for example, by condensing a cyanuric halide with the amines of formulae

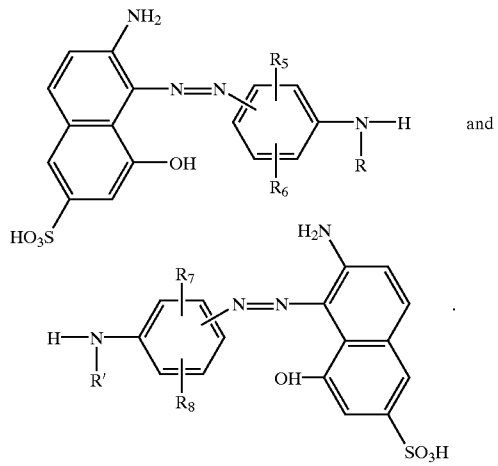

Dyes of formula (3) can be obtained, for example, by condensing a cyanuric halide with the amines of formulae

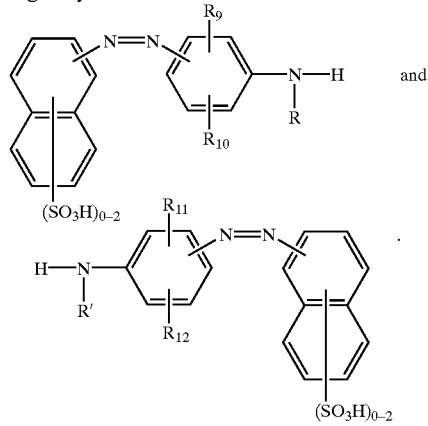

Dyes of formula (4) can be obtained, for example, by condensing a cyanuric halide with the amines of formulae

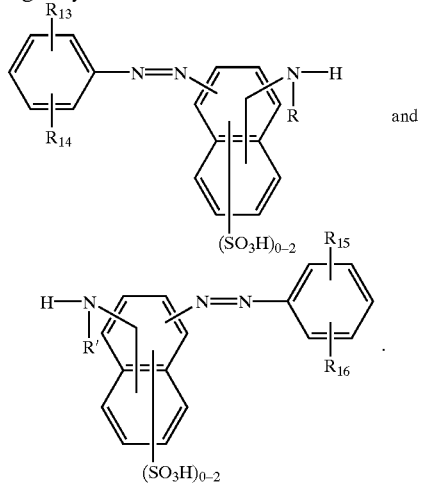

Preference is given to reacting the cyanuric halide firstly with an approximately stoichiometric amount of one of the two aminoazo compounds at a temperature of from −5 to 20° C., the pH being kept neutral to slightly acid, preferably at from 5 to 7, by adding suitable bases, for example alkali metal bases such as lithium hydroxide or carbonate, sodium hydroxide or carbonate or potassium hydroxide or carbonate. The triazine derivative obtained can be separated off or the reaction mixture can be used directly for further reaction. Advantageously, an approximately stoichiometric amount of the other of the two aminoazo compounds is added to the reaction mixture obtained or to the triazine derivative previously separated off and is reacted with the triazine derivative at a slightly elevated temperature, preferably from 30 to 50° C., and at a neutral to slightly acid pH, preferably from 6 to 7. If the two aminoazo compounds are identical aminoazo compounds, approximately 2 equivalents of the aminoazo dye in question are reacted with 1 equivalent of the cyanuric halide, the temperature preferably being initially maintained at from −5 to 20° C. and then increased to about from 30 to 50° C.

The aminoazo compounds are known or can be prepared in analogy to known compounds. For example, the azo compounds can be obtained by conventional diazotisation and coupling reactions.

The diazotisation is customarily carried out using a nitrite, for example an alkali metal nitrite such as sodium nitrite, in a mineral acid medium, for example in a hydrochloric acid medium, at temperatures of, for example, from −5 to 30° C. and preferably from 0 to 10° C.

The coupling is customarily carried out at acid, neutral or slightly alkaline pH values and temperatures of, for example, from −5 to 30° C., preferably from 0 to 25° C.

The dyes used in the trichromatic dyeing or printing method according to the invention are present either in their free sulfonic acid form or, preferably, in the form of a salt thereof.

Suitable salts are, for example, alkali metal, alkaline earth metal or ammonium salts or salts of an organic amine. Examples that may be mentioned are sodium, lithium, potassium or ammonium salts or a mono-, di- or tri-ethanolamine salt.

The dyes used in the method according to the invention may comprise further additives, for example sodium chloride or dextrin.

The trichromatic dyeing or printing method according to the invention can be applied to the customary dyeing and printing methods. The dye liquors or printing pastes, in addition to comprising water and the dyes, may also comprise further additives, for example wetting agents, antifoams, levelling agents or agents that influence the characteristics of the textile material, for example softeners, flame-retardant additives, or dirt-, water- and oil-repellents, and also water-softeners and natural or synthetic thickeners, for example alginates and cellulose ethers.

The trichromatic dyeing or printing method according to the invention is also suitable for dyeing from short liquors, for example in continuous dyeing methods and discontinuous or continuous foam dyeing methods.

The amounts in which the individual dyes are used in the dye baths or printing pastes can vary within wide limits depending on the required depth of shade; in general, amounts of from 0.01 to 15% by weight, especially from 0.1 to 10% by weight, based on the material to be dyed or the printing paste have proved to be advantageous.

Dyeing, especially by the exhaust process, is preferred.

Dyeing is preferably carried out at a pH of from 3 to 7, especially from 3 to 5. The liquor ratio can be selected within a wide range, for example from 1:5 to 1:50, preferably from 1:5 to 1:30. Dyeing is preferably carried out at a temperature of from 70 to 110° C., especially from 80 to 105° C.

When employed in trichromatic dyeing or printing, the dyes used in the method according to the invention are distinguished by uniform colour build-up, good uptake characteristics, good constancy of shade even at different concentrations, good fastness properties and solubility and, especially, by very good combinability.

The trichromatic dyeing or printing method according to the invention is suitable for dyeing or printing natural polyamide materials, for example wool, as well as, especially, synthetic polyamide materials, for example polyamide 6 or polyamide 6.6, and is suitable for dyeing or printing wool and synthetic polyamide blend fabrics or yarns.

The said textile material can be in a very wide variety of processing forms, for example in the form of fibres, yarn, woven fabrics, knitted fabrics or, especially, in the form of carpets.

Level dyeings having good all-round fastness properties, especially good fastness to rubbing, to wetting, to wet rubbing and to light, are obtained.

In the Examples that follow, parts indicate parts by weight. The temperatures are given in degrees Celsius. The relationship between parts by weight and parts by volume is the same as that between grams and cubic centimetres.

EXAMPLE 1

133.0 g of 1-amino-4-[(3-aminophenyl)amino]anthraquinone-2-sulfonic acid sodium salt, prepared from 1-amino-4-bromo-anthraquinone-2-sulfonic acid and 1,3-phenylenediamine in an aqueous medium by customary, known synthesis, (active content 69.6%), are introduced into 1200 ml of water at room temperature, with stirring. The pH is adjusted to 4 using 10 ml of 32% hydrochloric acid. A solution of 20.8 g of cyanuric chloride in 400 ml of dioxane is added dropwise to the resulting suspension over a period of 35 minutes. During the dropwise addition, the pH is maintained at 4 and afterwards is gradually increased to 7 using about 112 ml of 1 molar aqueous sodium carbonate solution. The pH is then adjusted to 9 using 5N sodium hydroxide solution and stirring is carried out for 18 hours at room temperature and at a pH constantly maintained at 9, for which 44 ml of sodium hydroxide solution are used. The precipitated product is filtered off and washed with 600 ml of a 7.5% aqueous solution of sodium chloride. After subsequently drying in vacuo at 60° C., 150 g of a dark-blue dye of formula

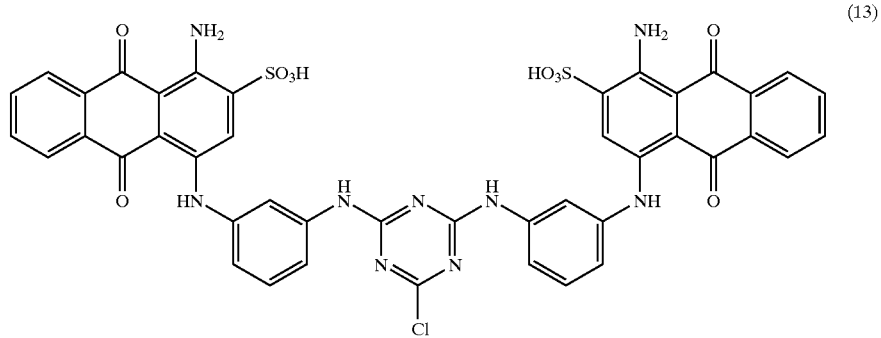

(13)

are obtained.

EXAMPLE 2

50 g of the dye of formula (13) prepared in Example 1 are dissolved in 500 ml of water/dioxane in a ratio of 1:1. After adding 50 ml of a 30% aqueous solution of sodium hydroxide, the mixture is heated to a temperature of from 80 to 85° C. and is stirred for 4 hours. After cooling, the pH is adjusted to 7 by the dropwise addition of about 40 ml of 32% hydrochloric acid. The precipitated product is filtered off and dried in vacuo at 70° C. 42 g of a dark-blue dye of formula

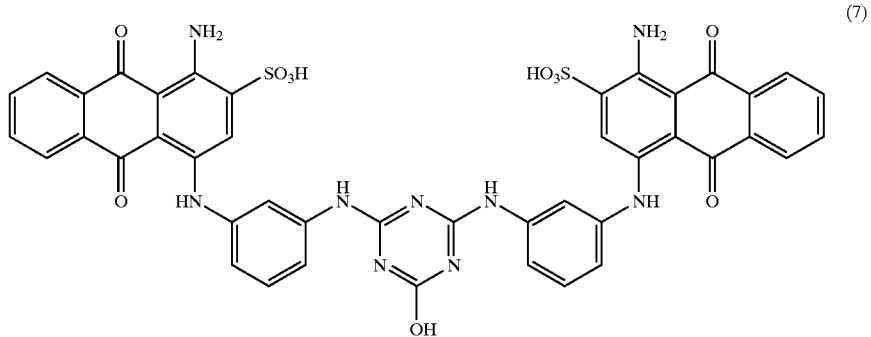

(7)

are obtained.

EXAMPLE 3

4.65 g of the dye of formula (13) prepared in Example 1 are dissolved in 100 ml of water/dioxane in a ratio of 1:1. After adding 7.5 g of glycine and 10 ml of 2N sodium hydroxide solution, the mixture is heated to a temperature of 85–90° C. and is stirred for 3 hours. After cooling, the precipitated product is filtered off and washed with 50 ml of a 10% aqueous solution of sodium chloride. After drying in vacuo at 70° C., 3.5 g of a dark-blue dye of formula

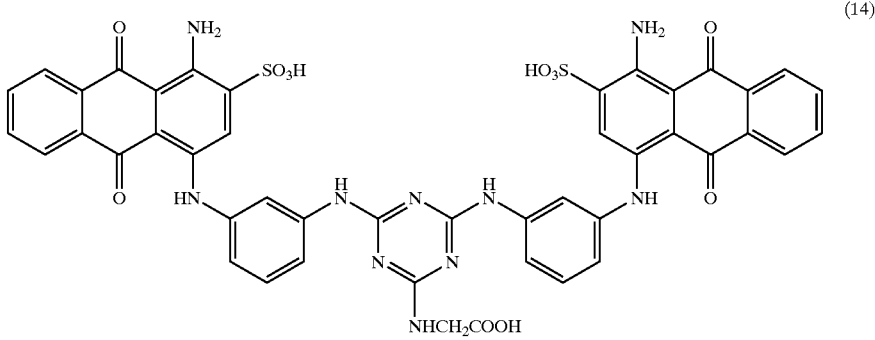

(14)

are obtained.

The following dyes listed in Table 1 can be prepared in analogy to the method described in Example 3:

TABLE 1

| Example no. | compound | formula |
|---|---|---|
| 4 | (structure with NHCH$_2$CH$_2$SO$_3$H group) | (15) |

TABLE 1-continued

| Example no. | compound | formula |
|---|---|---|
| 5 | [structure: bis-anthraquinone linked via NH-phenyl-NH-triazine-NH-phenyl-NH, triazine bearing CH(CH₃)CH₂CH₂SO₃H substituent] | (16) |
| 6 | [structure: bis-anthraquinone linked via NH-phenyl-NH-triazine-NH-phenyl-NH, triazine bearing NHCH₂CH₂OH substituent] | (17) |
| 7 | [structure: bis-anthraquinone linked via NH-phenyl-NH-triazine-NH-phenyl-NH, triazine bearing N(CH₂CH₂OH)₂ substituent] | (18) |
| 8 | [structure: bis-anthraquinone linked via NH-phenyl-NH-triazine-NH-phenyl-NH, triazine bearing morpholino substituent] | (19) |

TABLE 1-continued

| Example no. | compound | formula |
|---|---|---|
| 9 | | (20) |
| 10 | | (21) |
| 11 | | (22) |
| 12 | | (23) |

TABLE 1-continued

| Example no. | compound | | formula |
|---|---|---|---|
| 13 | | | (24) |
| 14 | | | (25) |

EXAMPLE 15

By following the procedure described in Example 1 but using, instead of 133.0 g of 1-amino-4-[(3-aminophenyl)amino]anthraquinone-2-sulfonic acid sodium salt, 26 g of the compound of formula

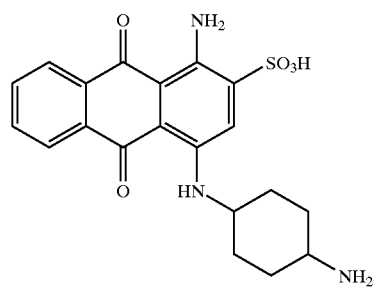

(26)

and equimolar amounts of the other reactants, 29 g of a dark-blue dye of formula are obtained.

EXAMPLE 16

By following the procedure described in Example 1 but using, instead of 133.0 g of 1-amino-4-[(3-aminophenyl)amino]anthraquinone-2-sulfonic acid sodium salt, 15 g of the compound of formula

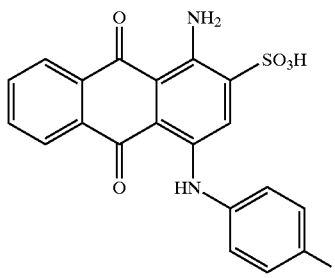

(27)

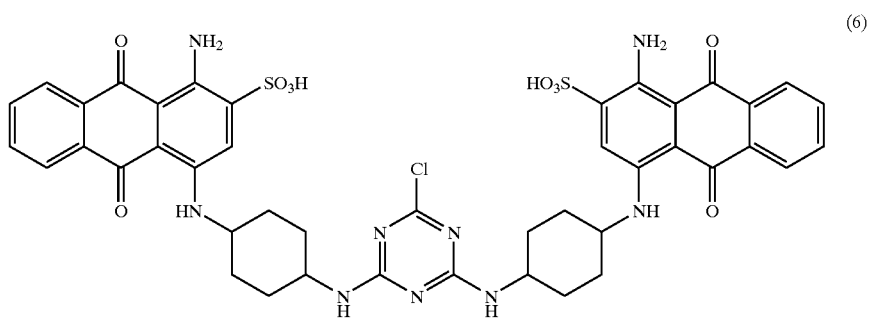

(6)

and equimolar amounts of the other reactants, 22 g of a dark-blue dye of formula
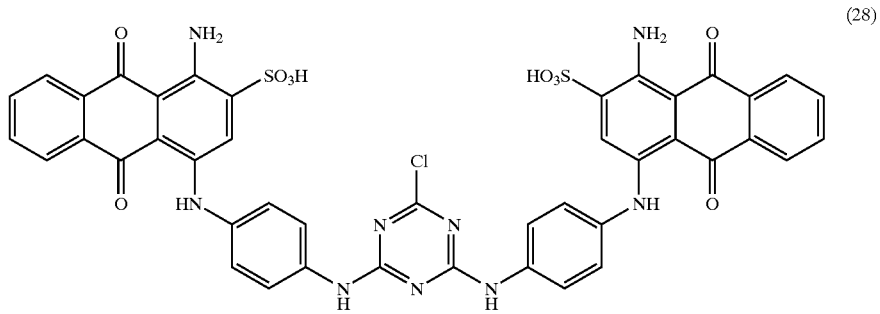
(28)
are obtained.
Dyeing Example 1
10 parts by weight of polyamide 6.6 fibre material (Helancatricot®) are introduced at 30° C. into a dye bath containing, per 100 parts by weight of water, 0.063 part by weight of the dye of formula
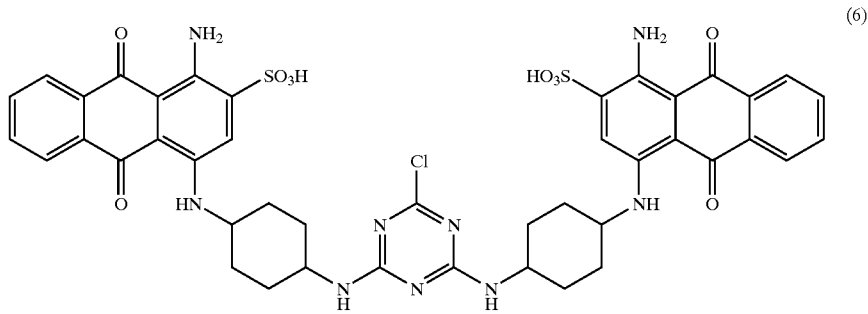
(6)
from Example 15, 0.017 part of the dye of formula
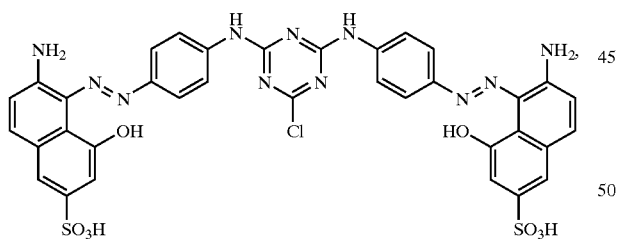
(29)
0.015 part of the dye of formula
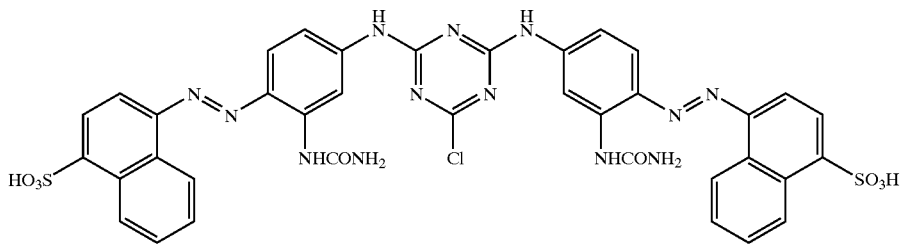
(30)

and 0.1 part by weight of sodium acetate, and the pH is adjusted to 5 using acetic acid.

The dye bath is heated to boiling over the course of 45 minutes and maintained at boiling temperature for a further 60 minutes. The dyed fibre material is then taken out, rinsed and dried. A claret-coloured piece of fabric is obtained, having good overall fastness properties, the 3 dyes having been taken up at the same time.

Dyeing Example 2

By proceeding as described in Dyeing Example 1 but using, instead of 0.063 part by weight of the dye of formula (6), 0.033 part by weight of the dye of formula

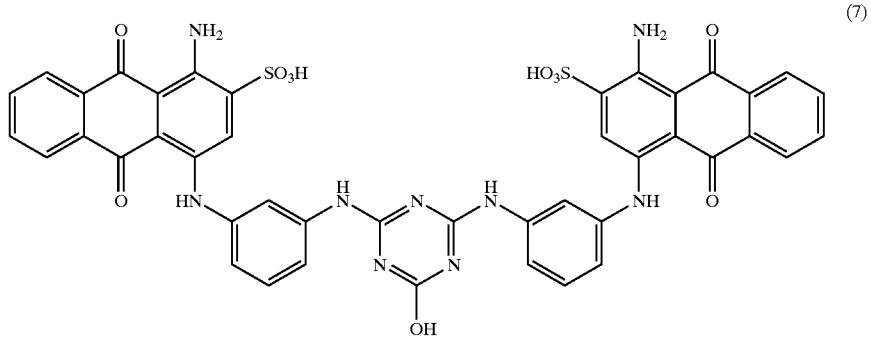

(7)

from Example 2, a dyeing having equally good overall fastness properties is obtained, all 3 dyes likewise having been taken up at the same time.

What is claimed is:

1. A method for the trichromatic dyeing or printing of natural or synthetic polyamide fibre material, which method comprises contacting the fibre material with a tinctorially effective amount of a dye mixture comprising at least one blue-dyeing dye of formula

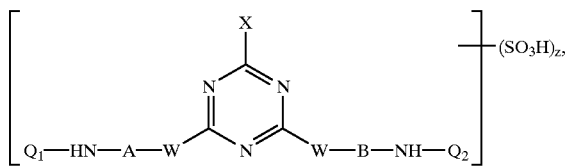

(1)

wherein

X is halogen, hydroxy, $C_1$–$C_4$alkoxy, S—$C_1$–$C_4$alkyl, —$NHR_1$, —$NR_1R_2$, morpholino, piperidino or azepano, $R_1$ being unsubstituted $C_1$–$C_4$alkyl or hydroxy- or carboxy-substituted $C_1$–$C_4$alkyl, and $R_2$ being unsubstituted $C_1$–$C_4$alkyl or phenyl or hydroxy-, sulfo-, carboxy- or phenyl-substituted $C_1$–$C_4$alkyl or phenyl, W is —$NR_3$— or —O—, $R_3$ being hydrogen or $C_1$–$C_4$alkyl, A and B are each independently of the other a cycloaliphatic or aromatic bridge member, $Q_1$ and $Q_2$ are each independently of the other an anthraquinone radical, and z is an integer 2, 3 or 4, together with at least one red-dyeing dye of formula (2)

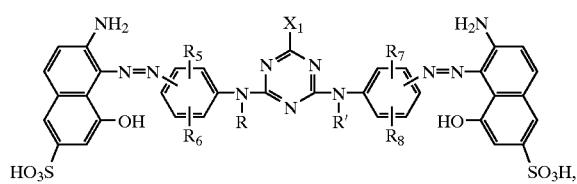

wherein

R and R' are each independently of the other hydrogen or unsubstituted or substituted $C_1$–$C_4$alkyl, $R_5$, $R_6$, $R_7$ and $R_8$ are each independently of the others hydrogen, $C_1$–$C_4$alkyl, $C_1$–$C_4$alkoxy, $C_2$–$C_4$alkanoylamino, ureido, halogen or sulfo, and $X_1$ is halogen, hydroxy, $C_1$–$C_4$alkoxy, S—$C_1$–$C_4$alkyl, —$NHR_1$, —$NR_1R_2$, morpholino, piperidino or azepano, $R_1$ being unsubstituted or hydroxy- or carboxy-substituted $C_1$–$C_4$alkyl, and $R_2$ being unsubstitutied or hydroxy-, sulfo-, carboxy- or phenyl-substituted $C_1$–$C_4$alkyl or phenyl, and together with at least one yellow- or orange-dyeing dye of formula (3)

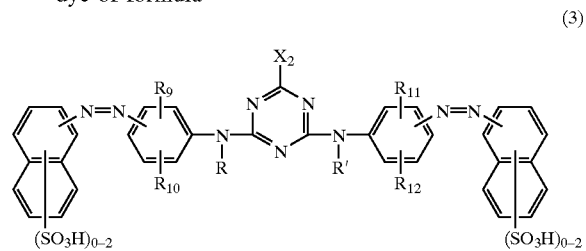

or of formula (4)

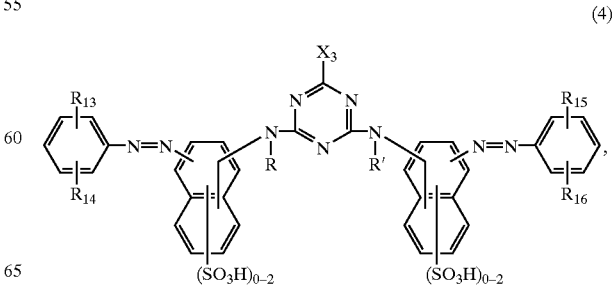

wherein

R and R' are each independently of the other hydrogen or unsubstituted or substituted $C_1$–$C_4$alkyl, $X_2$ and $X_3$ are each independently of the other halogen, hydroxy, $C_1$–$C_4$alkoxy, S—$C_1$–$C_4$alkyl, —$NHR_1$, —$NR_1R_2$, morpholino, piperidino or azepano, $R_1$ being unsubstituted or hydroxy- or carboxy-substituted $C_1$–$C_4$alkyl, and $R_2$ being unsubstituted or hydroxy-, sulfo-, carboxy- or phenyl-substituted $C_1$–$C_4$alkyl or phenyl, and $R_9$, $R_{10}$, $R_{11}$, $R_{12}$, $R_{13}$, $R_{14}$, $R_{15}$ and $R_{16}$ are each independently of the others hydrogen, $C_1$–$C_4$alkyl, $C_1$–$C_4$alkoxy, ureido, halogen, sulfo, or $C_2$–$C_4$alkanoylamino or $C_1$–$C_4$alkoxycarbonylamino each of which is unsubstituted or substituted in the alkyl moiety.

2. A method according to claim 1, which comprises using at least one blue-dyeing dye of formula

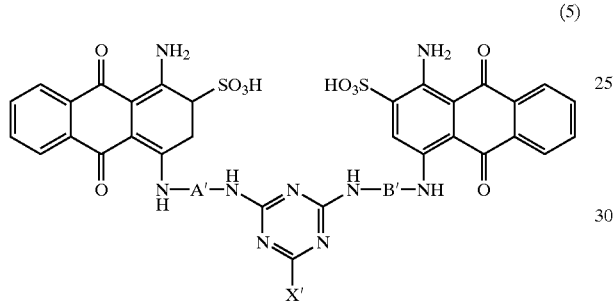
(5)

wherein

X' is —Cl, —OH, —N(CH$_2$CH$_2$OH)$_2$, —N(CH$_3$)(CH$_2$CH$_2$SO$_3$H), —NHCH$_2$COOH, —N(CH$_2$CH$_2$CH$_2$CH$_3$)$_2$,

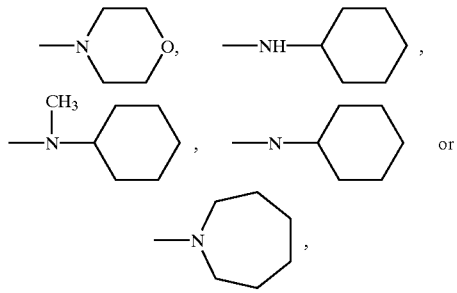

A' is a cyclohexylene or phenylene radical and

B' is a cyclohexylene or phenylene radical.

3. A method according to claim 1, which comprises dyeing or printing wool or synthetic polyamide fibre materials.

4. A method according to claim 3, which comprises dyeing or printing synthetic polyamide fibre materials.

5. Natural or synthetic polyamide fibre material dyed or printed with a tinctorially effective amount of a dye mixture comprising dyes of formulas (1), (2) and (3) or dyes of formulas (1), (2) and (4), according to claim 1.

6. A dye mixture which comprises at least one blue-dyeing dye of formula

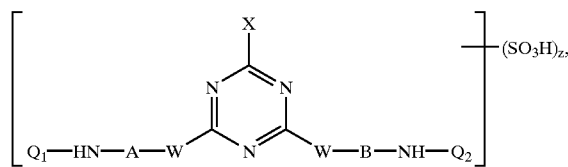
(1)

wherein

X is halogen, hydroxy, $C_1$–$C_4$alkoxy, S—$C_1$–$C_4$alkyl, —$NHR_1$, —$NR_1R_2$, morpholino, piperidino or azepano, $R_1$ being unsubstituted or hydroxy- or carboxy-substituted $C_1$–$C_4$alkyl, and $R_2$ being unsubstituted or hydroxy-, sulfo-, carboxy- or phenyl-substituted $C_1$–$C_4$alkyl or phenyl, W is —$NR_3$— or —O—, $R_3$ being hydrogen or $C_1$–$C_4$alkyl, A and B are each independently of the other a cycloaliphatic or aromatic bridge member, $Q_1$ and $Q_2$ are each independently of the other an anthraquinone radical, and z is an integer 2, 3 or 4, at least one red-dyeing dye of formula

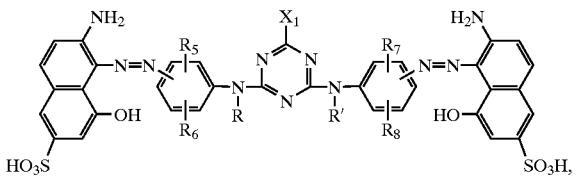
(2)

wherein

R and R' are each independently of the other hydrogen or unsubstituted or substituted $C_1$–$C_4$alkyl, $R_5$, $R_6$, $R_7$ and $R_8$ are each independently of the others hydrogen, $C_1$–$C_4$alkyl, $C_1$–$C_4$alkoxy, $C_2$–$C_4$alkanoylamino, ureido, halogen or sulfo, and $X_1$ is halogen, hydroxy, $C_1$–$C_4$alkoxy, S—$C_1$–$C_4$alkyl, —$NHR_1$, —$NR_1R_2$, morpholino, piperidino or azepano, $R_1$ being unsubstituted or hydroxy- or carboxy-substituted $C_1$–$C_4$alkyl, and $R_2$ being unsubstituted or hydroxy-, sulfo-, carboxy- or phenyl-substituted $C_1$–$C_4$alkyl or phenyl, and at least one yellow- or orange-dyeing dye of formula

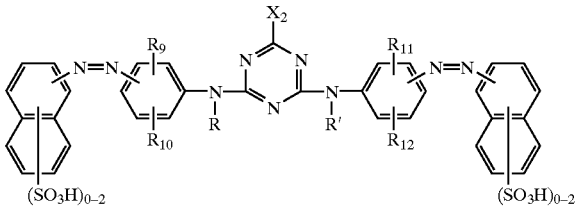
(3)

or of formula (4)

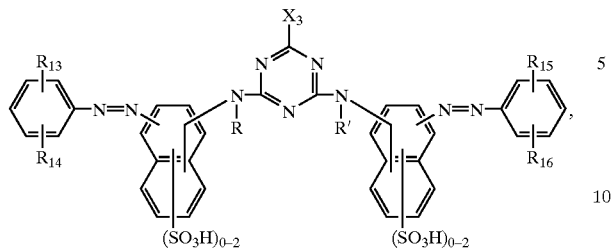

wherein

R and R' are each independently of the other hydrogen or unsubstituted or substituted $C_1$–$C_4$alkyl, $X_2$ and $X_3$ are each independently of the other halogen, hydroxy, $C_1$–$C_4$alkoxy, S—$C_1$–$C_4$alkyl, —$NHR_1$, —$NR_1R_2$, morpholino, piperidino or azepano, $R_1$ being unsubstituted or hydroxy- or carboxy-substituted $C_1$–$C_4$alkyl, and $R_2$ being unsubstituted or hydroxy-, sulfo-, carboxy- or phenyl-substituted $C_1$–$C_4$alkyl or phenyl, and $R_9$, $R_{10}$, $R_{11}$, $R_{12}$, $R_{13}$, $R_{14}$, $R_{15}$ and $R_{16}$ are each independently of the others hydrogen, $C_1$–$C_4$-alkyl, $C_1$–$C_4$alkoxy, ureido, halogen, sulfo, or $C_2$–$C_4$alkanoylamino or $C_1$–$C_4$alkoxycarbonylamino each of which is unsubstituted or substituted in the alkyl moiety.

* * * * *